United States Patent Office.

MARTIN F. COOMES AND ARUNAH W. HYDE, OF LOUISVILLE, KENTUCKY.

PROCESS OF CARBURIZING MALLEABLE CAST-IRON OR LOW-CARBON STEEL.

SPECIFICATION forming part of Letters Patent No. 422,118, dated February 25, 1890.

Application filed May 29, 1889. Serial No. 312,565. (Specimens.)

*To all whom it may concern:*

Be it known that we, MARTIN F. COOMES and ARUNAH W. HYDE, citizens of the United States, residing at Louisville, in the county of Jefferson and State of Kentucky, have invented certain new and useful Improvements in the Process of Carburizing Malleable Cast-Iron or Low-Carbon Steel; and we do declare the following to be a full, clear, and exact description of the invention, such as will enable others skilled in the art to which it appertains to make and use the same.

Our invention relates to the manufacture of steel, and its object is to effect a cheap and rapid carburization of malleable cast-iron, or of low-carbon steel, by the use of certain carbon compounds which are readily decomposed by contact with the heated metal to be carburized, whereby the carbon is set free and unites with the metal, thus converting the malleable cast-iron into steel, or the low-carbon steel into high-carbon steel.

To carry our invention into effect, we employ any of those substances which in the science of chemistry are known as "carbohydrates," including the sucroses, (cane-sugar, &c.,) glucoses, (grape-sugar, &c.,) and amyloses, (starch, &c.) They are rich in carbon combined with hydrogen and oxygen, the latter always in the proportion to form water. Of any one of these substances we form a bath by dissolving it in any quantity in water or in milk. In this bath is placed the metal raised to a white heat, where it is allowed to remain while cooling. The metal parts with its heat, which decomposes the carbohydrate, the hydrogen and oxygen forming water, while the carbon, which is thus set free, is absorbed by and chemically unites with the metal.

In our process the carbohydrates may be employed either singly or mixed together, and in any desired quantity to supply the requisite carbon, a deficiency or surplus of carbon affecting the extent and economy, but not the completeness, of the carburization. A quantity insufficient to convert the whole mass will case-harden it, if case-hardening is desired, or the metal may be reheated and the process repeated. When desired, before placing the heated metal in it, the bath may be heated to any extent short of decomposing it.

In our process the carbohydrates may be used in a pure state or mixed with such substances as convert them into carbonic or carbonaceous compounds, such as alkalies, alkaline carbonates, or mineral acids. As before described, in either case the contact of the heated metal sets free the carbon, which is absorbed by and unites with the metal.

The most useful and available carbohydrates for our process are sugars of any kind and their equivalents—namely, sirups of any kind, molasses or other liquid residues of sugar-making, and honey.

We have found by experiment that the following baths give excellent results, viz: First, sugar or molasses, one pound, water, one gallon; second, sugar, one ounce, condensed milk, one pound, water, one gallon; third, honey, one pound, water, one gallon.

Having fully described our invention, what we claim, and desire to secure by Letters Patent, is—

1. In the manufacture of steel, the process of carburizing malleable cast-iron or low-carbon steel, which consists in placing the metal raised to a white heat in a bath composed of water or milk and a carbohydrate, substantially as described.

2. In the manufacture of steel, the process of carburizing malleable cast-iron or low-carbon steel, which consists in placing the metal raised to a white heat in a bath composed of water or milk and a sugar, substantially as described.

In testimony whereof we affix our signatures in presence of two witnesses.

MARTIN F. COOMES.
    ARUNAH W. HYDE.

Witnesses:
 W. E. BUCKEL,
 W. C. PETTY.